(12) United States Patent
Shibasaki

(10) Patent No.: US 8,444,273 B2
(45) Date of Patent: May 21, 2013

(54) LIGHT SOURCE DEVICE, PROJECTION APPARATUS, AND PROJECTION METHOD

(75) Inventor: Mamoru Shibasaki, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/593,880

(22) Filed: Aug. 24, 2012

(65) Prior Publication Data

US 2012/0320109 A1    Dec. 20, 2012

Related U.S. Application Data

(63) Continuation of application No. 12/856,892, filed on Aug. 16, 2010, now Pat. No. 8,272,745.

(30) Foreign Application Priority Data

Aug. 21, 2009   (JP) ................................. 2009-192596

(51) Int. Cl.
*G03B 21/14*   (2006.01)
(52) U.S. Cl.
USPC .................. 353/31; 353/85; 353/94; 348/743
(58) Field of Classification Search .................... 353/31, 353/84, 85, 94; 348/742, 743, 771; 362/231
See application file for complete search history.

(56) References Cited

U.S. PATENT DOCUMENTS

| 6,252,636 | B1 * | 6/2001 | Bartlett | 348/743 |
| 7,441,907 | B2 * | 10/2008 | Liu | 353/85 |
| 8,052,279 | B2 | 11/2011 | Wang et al. | |
| 2006/0007407 | A1 * | 1/2006 | Matsui | 353/84 |
| 2006/0158566 | A1 | 7/2006 | Sugiyama | |

(Continued)

FOREIGN PATENT DOCUMENTS

| JP | 2004-341105 A | 12/2004 |
| JP | 2006-184568 A | 7/2006 |

(Continued)

OTHER PUBLICATIONS

Japanese Office Action dated Jul. 12, 2011, issued in counterpart Japanese Application No. 2009-192596, and English translation thereof.

(Continued)

*Primary Examiner* — William C Dowling
(74) *Attorney, Agent, or Firm* — Holtz, Holtz, Goodman & Chick, P.C.

(57) ABSTRACT

A light source device includes a first light source configured to emit light in a first wavelength band, a light-source light generation section configured to generate light of each of a plurality of colors by time division by using the first light source, a second light source configured to generate light of a second wavelength band different from the first wavelength band, and a light source control section. The light source control section is configured to cause each of the light-source light generation section and the second light source to generate light in one period, and to control a drive timing of each of the first and second light sources to adjust a light-emission timing and a light-emission period of light generated by each of the light-source light generation section and the second light source.

10 Claims, 5 Drawing Sheets

U.S. PATENT DOCUMENTS

| | | |
|---|---|---|
| 2007/0127237 A1 | 6/2007 | Shimaoka et al. |
| 2008/0239248 A1 | 10/2008 | Mihara et al. |
| 2008/0266668 A1 | 10/2008 | Penn |
| 2009/0141188 A1 | 6/2009 | Shirai et al. |
| 2009/0141189 A1* | 6/2009 | Shirai et al. .................. 348/743 |
| 2009/0322797 A1 | 12/2009 | Tokui |
| 2010/0328554 A1 | 12/2010 | Shibasaki |
| 2011/0043765 A1* | 2/2011 | Shibasaki ...................... 353/31 |
| 2011/0075103 A1 | 3/2011 | Ogawa et al. |
| 2011/0075106 A1 | 3/2011 | Shibasaki |

FOREIGN PATENT DOCUMENTS

| | | |
|---|---|---|
| JP | 2007-156270 A | 6/2007 |
| JP | 2007-218956 A | 8/2007 |
| JP | 2008-261998 A | 10/2008 |
| WO | WO 2008/015953 A1 | 2/2008 |

OTHER PUBLICATIONS

Extended European Search Report dated Oct. 5, 2010 (in English), issued in counterpart European Application No. 10173483.8.

* cited by examiner

LIGHT SOURCE DEVICE, PROJECTION APPARATUS, AND PROJECTION METHOD

CROSS-REFERENCE TO RELATED APPLICATIONS

This is a Continuation Application of U.S. application Ser. No. 12/856,892, filed Aug. 16, 2010, now U.S. Pat. No. 8,272,745 which is based upon and claims the benefit of priority from prior Japanese Patent Application No. 2009-192596, filed Aug. 21, 2009, the entire contents of both of which are incorporated herein by reference.

BACKGROUND OF THE INVENTION

1. Field of the Invention

The present invention relates to a light source device, projection apparatus, and projection method suitable for a projector apparatus or the like.

2. Description of the Related Art

For example, in Pat. Document 1 (Jpn. Pat. Appln. KOKAI Publication No. 2004-341105), in a projection display apparatus, in order to carry out color display, a surface light source emitting primary-color light of each of red, green, and blue, and spatial light modulator corresponding thereto are required, and hence the number of pieces of components are increased, and downsizing, weight saving, and price reduction of the overall apparatus cannot be achieved. Thus, a technique in which a light-emitting diode emitting ultraviolet is used as a light source, a visible light reflection film having characteristics of transmitting ultraviolet light, and reflecting visible light is formed on a surface of a color wheel irradiated with ultraviolet light from the light-emitting diode, and a fluorescent substance layer emitting visible light corresponding each of red, green, and blue by ultraviolet light irradiation is formed on the back surface side of the color wheel is contrived.

However, including the technique described in above Pat. Document, conventional techniques have problems. FIGS. 5A and 5B exemplify a change in color of light emitted from the light source side of a case where a single light source and color wheel are used. FIG. 5A shows the configuration of a color wheel 1 constituted of color filters 1R, 1G, and 1B of red, green, and blue in each of which a central angle is set at 120°. The rotational position of the color wheel to be inserted in the light path from the light source is indicated by an angle from 0 to 360° of the rotational phase corresponding to the image frame.

In this color wheel 1, as shown in FIG. 5A, the color filter 1B of blue, color filter 1R of red, and color filter 1G of green are arranged in the order mentioned in the light path from the light source. FIG. 5B shows the color of the light-source light applied to the micromirror element configured to display an image, and color of the light-source light exiting from the color wheel 1.

As shown in FIG. 5B, a single light source is used to select light transmitted through each color filter, the selected light is applied to the micromirror element, and a light figure is formed by the reflected light of the micromirror element. For that reason, the color of the light-source light applied to the micromirror element, and color of the light-source light exiting from the color wheel 1 coincide with each other.

As shown in FIG. 5A, in the color wheel 1, the central angle of each of the color filters 1B, 1R, and 1G is fixedly constituted, and hence it is physically impossible to vary the width of each of the blue, red, and green field periods in the period of 360° in which the color wheel 1 rotates.

Accordingly, there has been the problem that it is not possible to cope with, for example, a change or the like in the transmission wavelength band characteristics of the color filter due to aged deterioration, or deal with the statuses of use desired by various users such as a case where adjustment of color balance is required, case where emphasis on the brightness of the image is more desired than the color reproducibility, and the like.

BRIEF SUMMARY OF THE INVENTION

Accordingly, it is an object of the present invention to provide a technique capable of responding to a desired color environment such as color balance, brightness of the projected image, or the like, as needed.

According to one aspect of the present invention, there is provided a light source device comprising: a first light source configured to emit light in a first wavelength band; a light-source light generation section configured to generate light of each of a plurality of colors by time division by using the first light source; a second light source configured to generate light of a second wavelength band different from the first wavelength band; and a light source control section configured to cause each of the light-source light generation section and the second light source to generate light in one period, and to control a drive timing of each of the first and second light sources to adjust a light-emission timing and a light-emission period of light generated by each of the light-source light generation section and the second light source.

According to another aspect of the present invention, there is provided a projection apparatus comprising: a first light source configured to emit light in a first wavelength band; a light-source light generation section configured to generate light of each of a plurality of colors by time division by using the first light source; a second light source configured to generate light of a second wavelength band different from the first wavelength band; a light source control section configured to cause each of the light-source light generation section and the second light source to generate light in one period, and to control a drive timing of each of the first and second light sources to adjust a light-emission timing and a light-emission period of the light generated by each of the light-source light generation section and the second light source; an input section configured to input an image signal; and a projection section configured to form and project a light figure of each color corresponding to the image signal input by the input section by using light generated from each of the light-source light generation section and the second light source under control carried out by the light source control section.

According to still another aspect of the present invention, there is provided a projection method applied to a projection apparatus including a first light source configured to emit light in a first wavelength band, a light-source light generation section configured to generate light of each of a plurality of colors by time division by using the first light source, a second light source configured to generate light of a second wavelength band different from the first wavelength band, an input section configured to input an image signal, and a projection section configured to form and project a light figure of each color corresponding to the image signal input by the input section by using light generated from each of the light-source light generation section and the second light source, the method comprising: causing each of the light-source light generation section and the second light source to generate light in one period, and controlling a drive timing of each of the first and second light sources to adjust a light-emission timing and a light-emission period of the light generated by each of the light-source light generation section and the second light source.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of a case where the present invention is applied to a data projector apparatus of the DLP (registered trademark) system will be described below with reference to the drawings.

Figure 1:
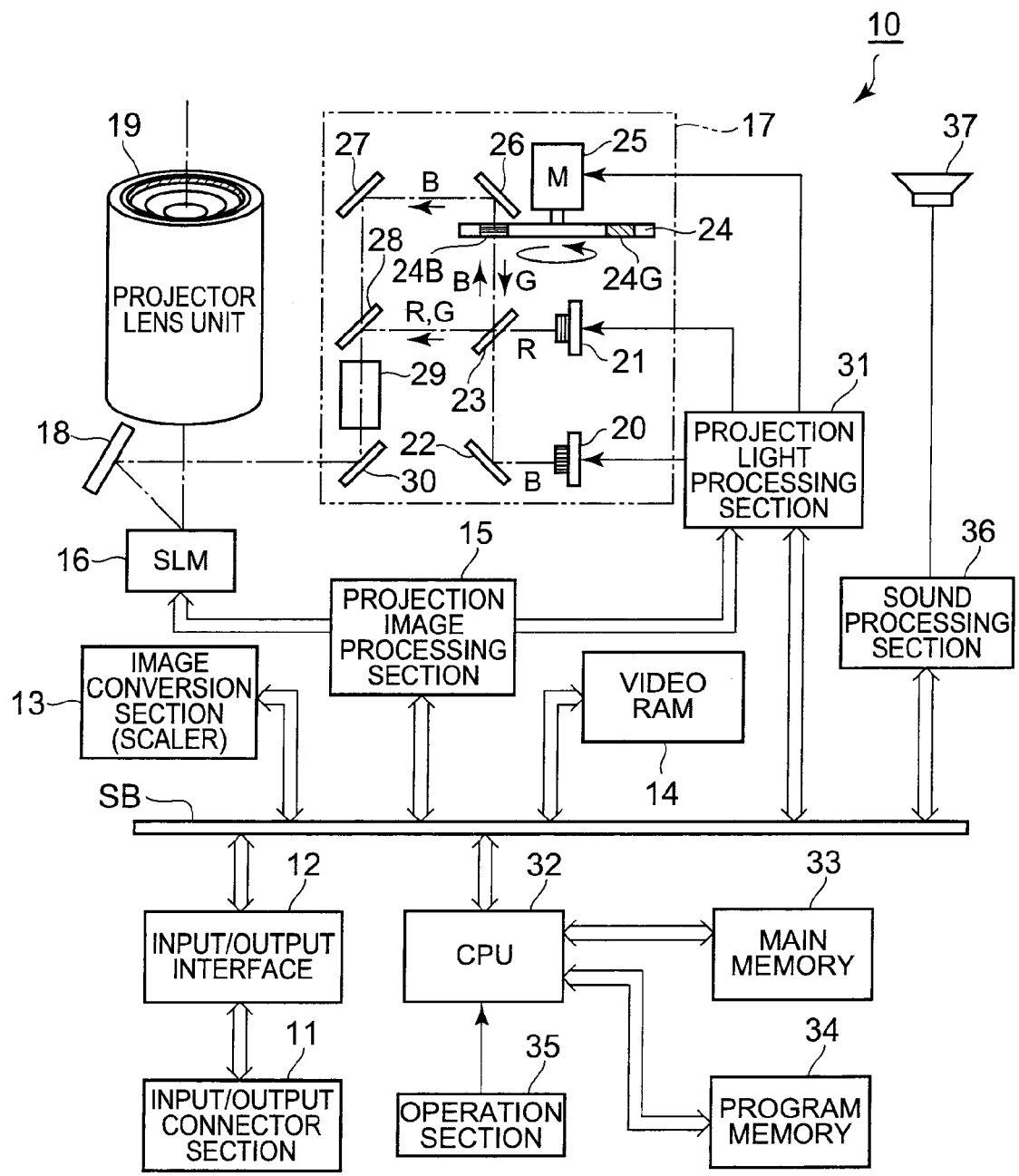
FIG. 1 is a block diagram showing the functional circuit configuration of an overall data projector apparatus according to an embodiment of the present invention.

FIG. 1 is a block diagram showing the schematic functional configuration of an electronic circuit provided in a data projector apparatus 10 according this embodiment.

A reference symbol 11 in FIG. 1 denotes an input/output connector section, which includes, for example, a pin-jack (RCA) type video input terminal, D-sub 15 type RGB input terminal, and Universal Serial Bus (USB) connector.

Image signals of various standards to be input from the input/output connector section 11 are input to an image conversion section 13 through an input/output interface 12, and system bus SB.

The image conversion section 13 converts the input image signals into image signals of a predetermined format suitable for projection, appropriately writes the image signals onto a video RAM 14 which is a buffer memory for display, thereafter reads the written image signals, and transmits the read image signals to a projection image processing section 15.

At this time, data such as symbols or the like indicating various operational states for On Screen Display (DSD) are superimposed on the image signals read from the video RAM 14 as the need arises, and the resultant image signals are written onto the video RAM 14 again. Thereafter, the processed image signals are read and transmitted to the projection image processing section 15.

The projection image processing section 15 display-drives a micromirror element 16 which is a spatial light modulation (SLM) element by time-division drive of higher speed obtained by multiplying a frame rate conforming to a predetermined format, for example, 120 frames/second by a division number of color components, and display gradation number in accordance with image signals transmitted thereto.

The micromirror element 16 forms a light figure by the light reflected therefrom by individually subjecting each of inclination angles of a plurality of minute mirrors arranged in an array corresponding to, for example, XGA (1024 pixels in the lateral direction×768 pixels in the longitudinal direction) to an on/off operation at high speed.

On the other hand, primary-color light components of red, green, and blue are cyclically emitted from a light source section 17 by time division. Each of the primary-color light components of red, green, and blue from the light source section 17 is reflected from a mirror 18, and is applied to the micromirror element 16. Further, a light figure is formed by the reflected light of the micromirror element 16, and the formed light figure is projection-displayed on a screen (not shown) which is a projection object through a projector lens unit 19.

The light source section 17 the specific optical configuration of which will be described later, includes two types of light sources, i.e., a semiconductor laser 20 emitting blue laser light, and LED 21 emitting red light.

The blue laser light emitted from the semiconductor laser 20 is reflected from a mirror 22, is thereafter transmitted through a dichroic mirror 23, and is then applied to one point on the circumference of a color wheel 24. The color wheel 24 is rotated by a motor 25. On the circumference of the color wheel 24 irradiated with the laser light, a green fluorescent reflection plate 24G and blue light transmission diffusion plate 24B are jointly formed into a ring-like shape.

When the green fluorescent reflection plate 24G of the color wheel 24 is located at the irradiation position of the laser light, green light is excited by the irradiation of the laser light, the excited green light is reflected from the color wheel 24, and is thereafter reflected also from the dichroic mirror 23. Thereafter, the green light is further reflected from a dichroic mirror 28, is formed into a light flux having substantially uniform luminance distribution by an integrator 29, is thereafter reflected from a mirror 30, and is then sent to the mirror 18.

Further, when the blue light transmission diffusion plate 24B of the color wheel 24 is located at the irradiation position of the laser light as shown in FIG. 1, the laser light is transmitted through the color wheel 24 while being diffused by the blue light transmission diffusion plate 24B, and is thereafter reflected from each of mirrors 26 and 27. Thereafter, the blue light is transmitted through the dichroic mirror 28, is formed into a light flux having substantially uniform luminance distribution by the integrator 29, is thereafter reflected from the mirror 30, and is then sent to the mirror 18.

Furthermore, the red light emitted from the LED 21 is transmitted through the dichroic mirror 23, is thereafter reflected from the dichroic mirror 28, is formed into a light flux having substantially uniform luminance distribution by the integrator 29, is thereafter reflected from the mirror 30, and is then sent to the mirror 18.

As described above, the dichroic mirror 23 has the spectral characteristics of transmitting the blue and red light therethrough, whereas reflecting the green light.

Further, the dichroic mirror 28 has the spectral characteristics of transmitting the blue light, whereas reflecting the red and green light.

The light emission timing of each of the semiconductor laser 20 and LED 21 of the light source section 17, and rotation of the color wheel 24 by the motor 25 are controlled by a projection light processing section 31 in a unifying manner. The projection light processing section 31 controls the light emission timing of each of the semiconductor laser 20, and LED 21, and the rotation of the color wheel 24 in accordance with the timing of the image data supplied from the projection image processing section 15.

A CPU 32 executes a control operation in the data projector apparatus 10 by using a main memory 33 constituted of a DRAM, and program memory 34 constituted of an electrically rewritable nonvolatile memory in which an operation program, various standardized data items are stored.

The CPU 32 executes various projection operations in accordance with key operation signals from an operation section 35.

The operation section 35 includes a key operation section provided on the main body of the data projector apparatus 10, and laser reception section configured to receive infrared light from a remote controller (not shown) to be exclusively used for the data projector apparatus 10, and directly outputs a key operation signal based on the key operated by the user by using the key operation section of the main body or the remote controller to the CPU 32.

The operation section 35 is provided with, together with the above-mentioned key operation section and remote controller, for example, a focus adjustment key (FOCUS), zoom adjustment key (ZOOM), input image switching key (INPUT), menu key (MENU), cursor (←, →, ↑, and ↓) key, set key (ENTER), cancel key (ESC), and the like.

The CPU 32 described above is further connected also to a sound processing section 36 through the system bus SB. The sound processing section 36 is provided with a sound source circuit such as a PCM sound source or the like, converts the sound data supplied thereto at the time of the projection operation into analog data, drives a speaker section 37 to loudspeaker-release the sound or generate beep sound or the like as the need arises.

Figure 2:
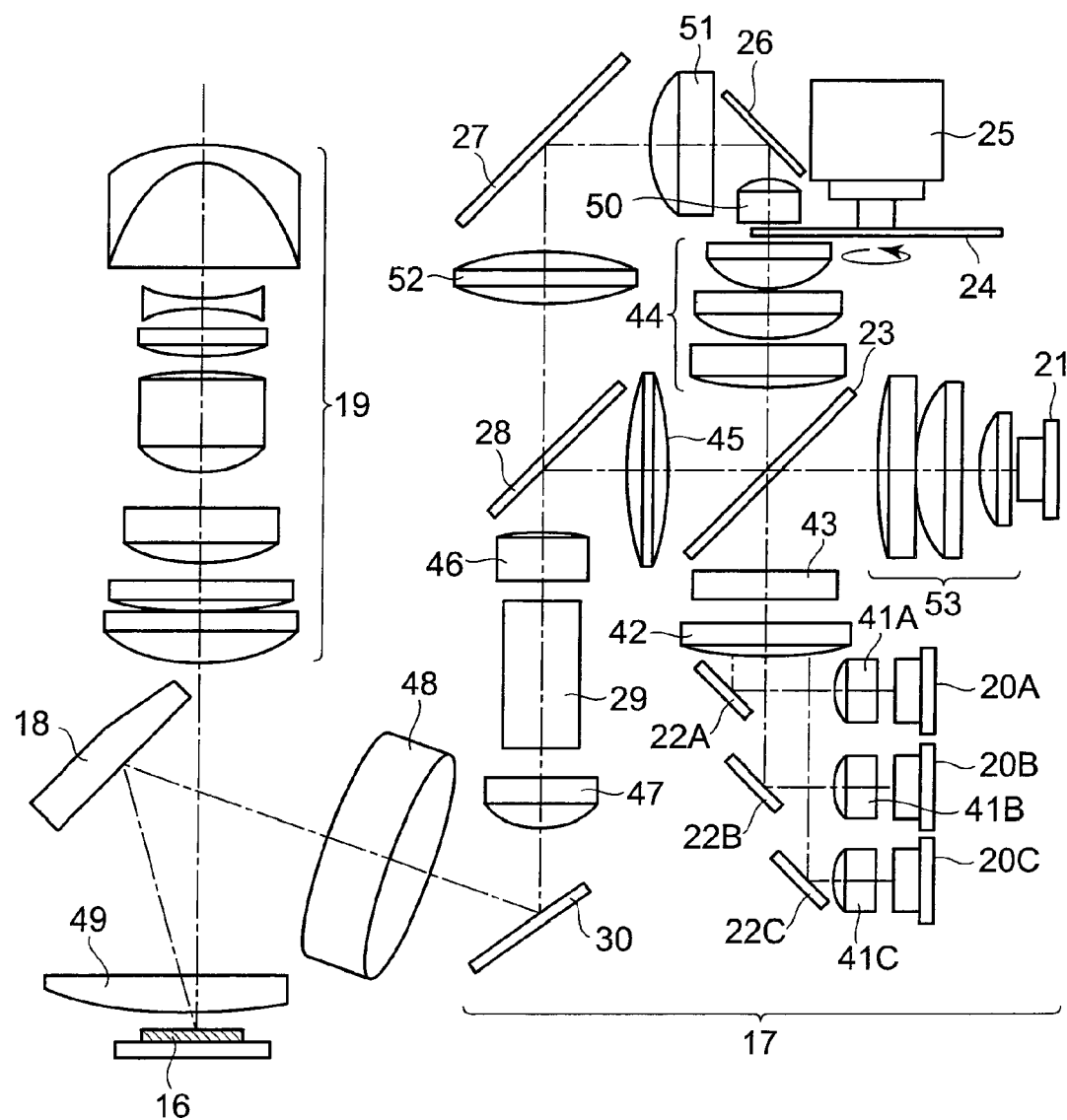
FIG. 2 is a view mainly showing the specific optical configuration of a light-source system according to the embodiment of the present invention.

Next, a specific configuration example of the optical system of the light source section 17 is mainly shown by FIG. 2. FIG. 2 is a view expressing the configuration of the periphery of the light source section 17 in the plane layout.

For example, three semiconductor lasers 20A, 20B, 20C, having the same light-emitting characteristics, are provided. The laser light of each of these semiconductor lasers 20A, 20B, 20C is blue and, for example, the emission wavelength is about 450 nm.

The blue light oscillated by each of these semiconductor lasers 20A, 20B, 20C is made substantially parallel with each other through each of lenses 41A to 41C, is then reflected from each of mirrors 20A, 20B, 20C, is passed through lenses 42 and 43, is thereafter transmitted through the dichroic mirror 23, then is transmitted through a lens group 44, and is then applied to the color wheel 24.

In this embodiment, the lenses 42 and 43, and lens group 44 constitute a light-condensation optical system configured to condense the substantially paralleled blue light at the position of the color wheel 24 on the optical axis.

On the color wheel 24, as described above, the blue light transmission diffusion plate 24B, and green fluorescent reflection plate 24G are positioned to constitute a ring on the same circumference.

When the green fluorescent reflection plate 24G of the color wheel is located at the irradiation position of the blue light, green light of a wavelength range centering on a wavelength of about 530 nm is excited by the irradiation. The excited green light is reflected from the reflection surface of the color wheel 24, and is thereafter reflected also from the dichroic mirror 23 through the lens group 44.

The green light reflected from the dichroic mirror 23 is further reflected from the dichroic mirror 28 through the lens 45, and is guided to the integrator 29 through a lens 46. In this embodiment, the lens group 44, lens 45, and lens 46 are designed to form a light guiding optical system 1 configured to guide the green light excited at the color wheel 24 to the integrator 29 in which the beam size of the green light fits in the aperture size of the integrator 29. The magnifying power of the light guiding optical system is designed to substantially coincide with the ratio of the aperture size of the integrator 29 to the irradiation size of the light to be applied to the color wheel 24.

Further, the green light is formed into a light flux having substantially uniform luminance distribution by the integrator 29, is thereafter reflected from the mirror 30 through a lens 47, and is sent to the mirror 18 through a lens 48.

The green light reflected from the mirror 18 is then applied to the micromirror element 16 through a lens 49. Further, a light figure of the green component is formed by the reflected green light, and is projected on the outside through the lens 49, and projector lens unit 19.

Further, when the blue light transmission diffusion plate 24B of the color wheel 24 is located at the irradiation position of the blue light, the blue light is transmitted through the color wheel 24 while being diffused by the blue light transmission diffusion plate 24B with lower diffusion characteristics than the green light excited by substantially perfect diffusion light. Furthermore, the blue light is reflected from the mirror 26 through a lens 50 located on the back side.

The motor 25 configured to rotate the color wheel 24 is arranged on the same side as the lens 50 configured to condense the blue light transmitted through the color wheel 24. The blue light transmitted through the color wheel 24 has lower diffusion than the green light reflected from the color wheel 24, and hence it is possible to make the size of the lens 50 smaller than the lens group 44 configured to condense the green light reflected from the color wheel 24.

Furthermore, the blue light is reflected from the mirror 27 through a lens 51, is passed through a lens 52, is then transmitted through the dichroic mirror 28, and is guided to the integrator 29 through the lens 46. In this embodiment, the lenses 50, 51, 52, and 46 are designed to form a light guiding optical system configured to guide the blue light transmitted through the color wheel 24 to the integrator 29 in which the beam size of the blue light fits in the aperture size of the integrator 29. The magnifying power of the light guiding optical system is designed to substantially coincide with the ratio of the aperture size of the integrator 29 to the irradiation size of the light to be applied to the color wheel 24.

Further, the blue light is formed into a light flux having substantially uniform luminance distribution by the integrator 29, is thereafter reflected from the mirror 30 through the lens 47, and is sent to the mirror 18 through the lens 48.

The blue light reflected from the mirror 18 is then applied to the micromirror element 16 through the lens 49. Further, a light figure of the blue component is formed by the reflected blue light, and is projected on the outside through the lens 49, and projector lens unit 19.

On the other hand, the LED 21 emits red light of, for example, a wavelength of 620 nm. The red light emitted from the LED 21 is transmitted through the dichroic mirror 23 through a lens group 53, is thereafter reflected from the dichroic mirror 28 through the lens 45, and is further guided to the integrator 29 through the lens 46. In this embodiment, the lens group 53, lens 45, and lens 46 are designed to form a light guiding optical system configured to guide the red light emitted in the emission size of the LED 21 to the integrator 29 in which the beam size of the red light fits in the aperture size of the integrator 29. The magnifying power of the light guiding optical system is designed to substantially coincide with the ratio of the aperture size of the integrator 29 to the emission size of the LED 21.

Further, the red light is formed into a light flux having substantially uniform luminance distribution by the integrator 29, is thereafter reflected from the mirror 30 through the lens 47, and is sent to the mirror 18 through the lens 48.

Further, the LED 21 is arranged near the semiconductor lasers 20A, 20B, 20C, and in a direction in which the optical axis thereof is parallel with those of the semiconductor lasers 20A, 20B, 20C. By arranging the LED 21 in this way, it becomes easy to integrate, although not shown, a heat sink provided on the back side of the LED 21, and configured to cool the LED 21, and heat sink provided on the back side of the semiconductor lasers 20A, 20B, 20C, and configured to cool the semiconductor lasers with each other, and it is further possible to reduce the size of the overall apparatus, and reduce the number of pieces of the components.

The red light reflected from the mirror 18 is then applied to the micromirror element 16 through the lens 49. Further, a light figure of the red component is formed by the reflected red light, and is projected on the outside through the lens 49, and projector lens unit 19.

Next, an operation of the embodiment will be described below.

Figure 3A:
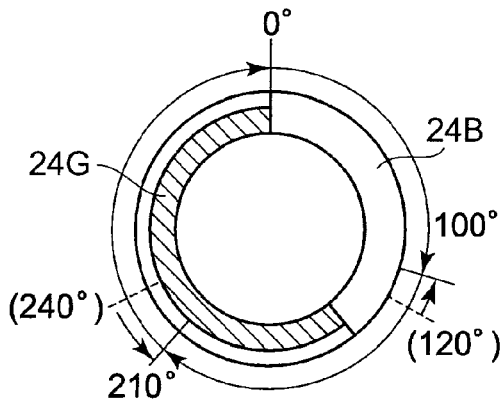
FIGS. 3A, 3B, and 3C are views respectively showing the configuration of a color wheel, and projection operation timing at each of the normal mode time, and green-emphasized mode time according to the embodiment of the present invention.

In this embodiment, as shown in FIG. 3A, the blue light transmission diffusion plate 24B constituting the color wheel 24 is arranged on a part of the circumference having a central angle of about 150° at a position of 0° to about 150° in the rotational phase corresponding to the image frame. On the other hand, the green fluorescent reflection plate 24G is arranged on a part of the circumference having a central angle of about 210° at a position of about 150 to 360° (0°) in the same rotational phase.

Here, it is assumed that it is possible to switch the mode between the normal mode and green-emphasized mode as two color modes.

Figure 3B:
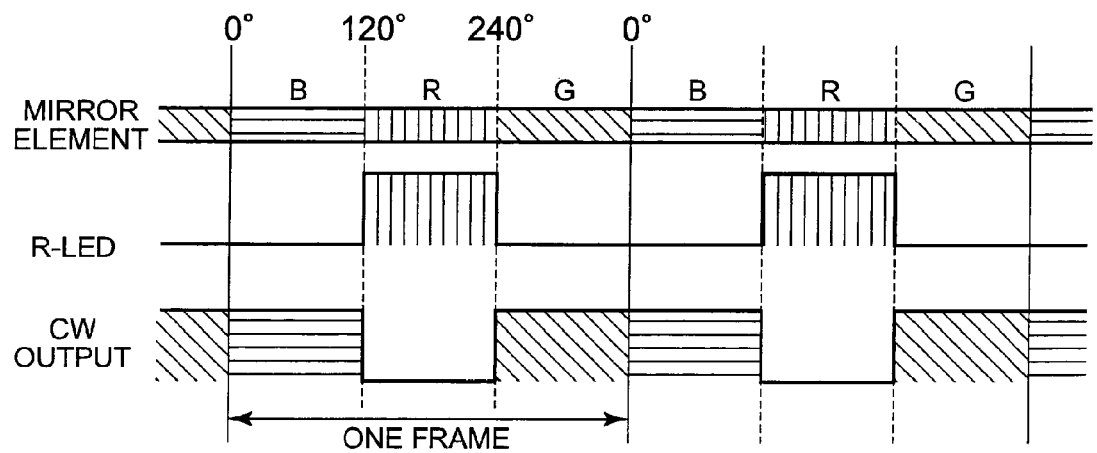

In the normal mode, as shown in FIG. 3B, the continued time ratio of periods in which the primary color images of blue, red, and green constituting one frame of the color image to be projected are projected is made 1:1:1.

The periods in which the primary color images of blue, red, and green are projected are defined as the B-, R- and G-fields, respectively.

That is, the continued time ratio b:r:g of the B-, R- and G-fields becomes 120°:120°:120° in terms of the central angles of the color wheel 24 with respect to 360° corresponding to one rotation of the color wheel 24 rotating at a constant rotational speed.

Figure 3C:
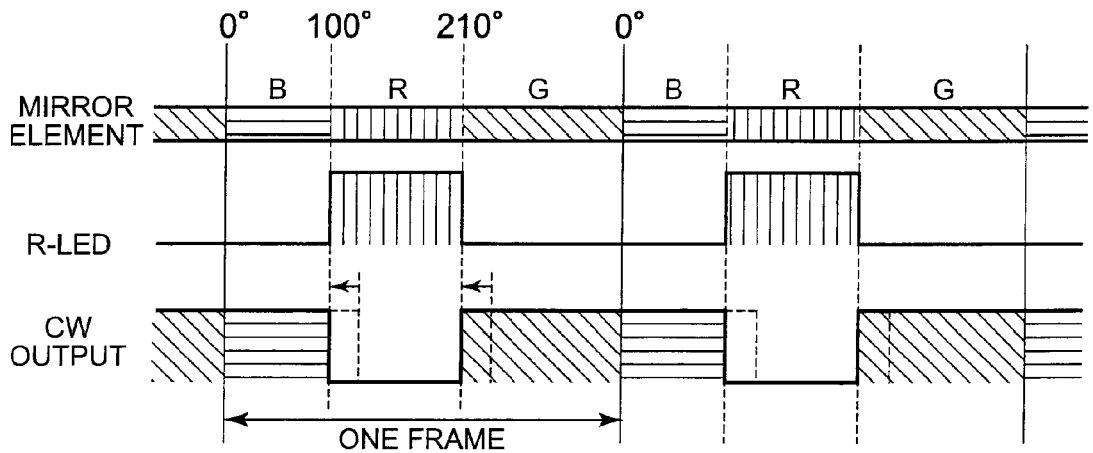

In the green-emphasized mode on the other side, as shown in FIG. 3C, the continued time ratio of periods in which the primary color images of blue, red, and green constituting one frame of the color image are projected is made 10:11:15.

That is, the continued time ratio b:r:g of the B-, R- and G-fields becomes 100°:110°:150° in terms of the central angles of the color wheel 24 with respect to 360° corresponding to one rotation of the color wheel 24 rotating at a constant rotational speed.

All the operation control concomitant with the switching of the color mode is executed by the projection light processing section 31 under the centralized control of the CPU 32.

FIG. 3B shows the relationship among the color of the light figure formed at the micromirror element 16 at the normal mode time, emission timing of the LED 21, emission timing of each of the semiconductor lasers 20A, 20B, 20C, and output of the color wheel 24.

At this normal mode time, at the beginning of one frame, in the period of the B-field corresponding to 120° in terms of the central angle of the color wheel 24, blue light is emitted by the oscillation of the semiconductor lasers 20A, 20B, 20C as shown by the CW output of FIG. 3B. Further, the blue light transmitted through the blue light transmission diffusion plate 24B of the color wheel 24, and diffused is applied to the micromirror element 16.

At this time, an image corresponding to the blue light is displayed by the micromirror element 16, whereby a blue light figure is formed by the reflected light thereof, and is projected onto an external projection object through the projector lens unit 19. During this period, the LED 21 is kept in the off-state.

Thereafter, the on-state of the LED 21 is started in synchronization with a temporary stop of the oscillation of the semiconductor lasers 20A, 20B, 20C. After that, in the period of the R-field corresponding to 120° in terms of the central angle of the color wheel 24, red light is emitted by the on-state of the LED 21, and is applied to the micromirror element 16 as shown by R-LED of FIG. 3B.

At this time, an image corresponding to the red light is displayed by the micromirror element 16, whereby a red light figure is formed by the reflected light thereof, and is projected onto the external projection object through the projector lens unit 19.

During this period, the oscillation of the semiconductor lasers 20A, 20B, 20C is temporarily stopped. Accordingly, even when the blue light transmission diffusion plate 24B or green fluorescent reflection plate 24G of the color wheel 24 exists at the position on the optical axis, the oscillation of the semiconductor lasers 20A, 20B, 20C is temporarily stopped, and hence neither blue light nor green light is generated as the light-source light.

Thereafter, in synchronization with turning-off of the LED 21, the oscillation at the semiconductor laser 20A, 20B, 20C is resumed. After that, in a period of the G-field corresponding to 120° in terms of the central angle of the color wheel 24, green reflected light excited at the green fluorescent reflection plate 24G of the color wheel 24 is applied to the micromirror element 16 as the light-source light.

At this time, an image corresponding to the green light is displayed by the micromirror element 16, whereby a green light figure is formed by the reflected light thereof, and is projected onto the external projection object through the projector lens unit 19.

Furthermore, the color wheel 24 rotates to terminate the G-field and one-frame periods.

Thereafter, when the blue light transmission diffusion plate 24B is positioned again on the optical axis from the semiconductor lasers 20A, 20B, 20C in place of the green fluorescent reflection plate 24G, the B-field period of the next frame is started.

As described above, the oscillation-timing and turning-on-timing of each of the semiconductor lasers 20A, 20B, 20C, and LED 21 are controlled in synchronization with the rotation of the color wheel 24 on which the blue light transmission diffusion plate 24B and green fluorescent reflection plate 24G are formed. As a result of this, the green and blue light resulting from the oscillation of the semiconductor lasers 20A, 20B, 20C, and red light resulting from the on-state of the LED 21 are cyclically generated by time division, and are applied to the micromirror element 16.

Next, an operation at the green-emphasized mode time will be described below.

FIG. 3C shows the relationship among the color of the light figure formed at the micromirror element 16 at the green-emphasized mode time, emission timing of the LED 21, emission timing of each of the semiconductor lasers 20A, 20B, 20C, and output of the color wheel 24.

At this green-emphasized mode time, at the beginning of one frame, in the period of the B-field corresponding to 100° in terms of the central angle of the color wheel 24, blue light is emitted by the oscillation of the semiconductor lasers 20A, 20B, 20C as shown by the CW output of FIG. 3C. Further, the blue light transmitted through the blue light transmission diffusion plate 24B of the color wheel 24, and diffused is applied to the micromirror element 16.

At this time, an image corresponding to the blue light is displayed by the micromirror element 16, whereby a blue light figure is formed by the reflected light thereof, and is projected onto an external projection object through the projector lens unit 19. During this period, the LED 21 is kept in the off-state.

Thereafter, the on-state of the LED 21 is started in synchronization with a temporary stop of the oscillation of the semiconductor lasers 20A, 20B, 20C. After that, in the period of the R-field corresponding 110° in terms of the central angle of the color wheel 24, red light is emitted by the on-state of the LED 21, and is applied to the micromirror element 16 as shown by R-LED of FIG. 3C.

At this time, an image corresponding to the red light is displayed by the micromirror element 16, whereby a red light figure is formed by the reflected light thereof, and is projected onto the external projection object through the projector lens unit 19.

During this period, the oscillation of the semiconductor lasers 20A, 20B, 20C is temporarily stopped. Accordingly, even when the blue light transmission diffusion plate 24B or green fluorescent reflection plate 24G of the color wheel 24 exists at the positions on the optical axis, the oscillation of the semiconductor lasers 20A, 20B, 20C is temporarily stopped, and hence neither blue light nor green light is generated as the light-source light.

Thereafter, in synchronization with turning-off of the LED 21, the oscillation at the semiconductor laser 20A, 20B, 20C is resumed. After that, in a period of the G-field corresponding to 150° in terms of the central angle of the color wheel 24, green reflected light excited at the green fluorescent reflection plate 24G of the color wheel 24 is applied to the micromirror element 16 as the light-source light.

At this time, an image corresponding to the green light is displayed by the micromirror element 16, whereby a green light figure is formed by the reflected light thereof, and is projected onto the external projection object through the projector lens unit 19.

Furthermore, the color wheel 24 rotates to terminate the G-field and one-frame periods.

Thereafter, when the blue light transmission diffusion plate 24B is positioned again on the optical axis from the semiconductor lasers 20A, 20B, 20C in place of the green fluorescent reflection plate 24G, the B-field period of the next frame is started.

As described above, the oscillation-timing and turning-on-timing of each of the semiconductor lasers 20A, 20B, 20C, and LED 21 are controlled in synchronization with the rotation of the color wheel 24 on which the blue light transmission diffusion plate 24B and green fluorescent reflection plate 24G are formed. As a result of this, the green and blue light resulting from the oscillation of the semiconductor lasers 20A, 20B, 20C, and red light resulting from the on-state of the LED 21 are cyclically generated by time division, and are applied to the micromirror element 16.

Furthermore, the R-field resulting from the on-state of the LED 21 is arranged in synchronization with the timing of the border between the blue light transmission diffusion plate 24B, and green fluorescent reflection plate 24G each constituting the color wheel 24, and the emission timing of each of the semiconductor lasers 20A, 20B, 20C, and LED 21 is controlled as shown at the normal mode time, and green-emphasized mode time described above, whereby it is made possible to adjust the time length of each of the B-, R- and G-fields in the one frame period.

As described above, according to this embodiment, although the above-mentioned optical system is an optical system using a color wheel, it becomes possible to arbitrarily adjust the time length to be assigned to each color component, and respond to desired color environment such as color balance, brightness of the projection image, or the like, as needed.

Particularly, in the green-emphasized mode, the projection time of the green image based on the green light closer to the luminance component than the other primary color components is set longer. As a result of this, not only an image in which the green light is simply emphasized as a whole is obtained, but also the luminance of the overall image is improved, and a brighter image is projected.

It should be noted that in the above embodiment, as a light source configured to generate blue and green light by using a color wheel 24, semiconductor lasers 20A, 20B, 20C are used, whereby it becomes possible to realize a stable operation particularly excellent in response speed and light intensity. Furthermore, it is possible to enhance the marketability by using an element more suitable for the light source of the data projector apparatus.

In addition to the above, with the fluorescent substance practically used at present, the efficiency of the wavelength conversion of converting the blue laser light to red laser light is low, and sufficient emission luminance cannot be obtained. Thus, by using a red LED as the second light source element, and making it possible to adjust the period of each of the primary color image fields as described above, it becomes possible to realize projection-display of the red image having sufficient emission luminance.

Another Operation Example

Next, another operation example according to this embodiment will also be described below.

Figure 4A:
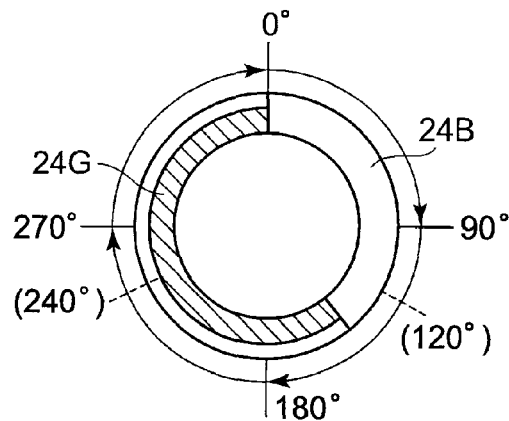
FIGS. 4A, 4B, and 4C are views respectively showing the configuration of a color wheel, and projection operation timing at each of the normal mode time, and luminance-emphasized mode time according to another operation example of the embodiment of the present invention.

In this operation example too, it is assumed that as shown in FIG. 4A, while a blue light transmission diffusion plate 24B constituting a color wheel 24 is arranged on a part of the circumference having a central angle of about 150° at a position of 0° to about 150° in the rotational phase corresponding to the image frame, a green fluorescent reflection plate 24G is arranged on a part of the circumference having a central angle of about 210° at a position of about 150 to 360° (0°) in the same rotational phase.

Here, it is also assumed that it is possible to switch the mode between the normal mode and luminance-emphasized mode as two color modes.

In the normal mode, the continued time ratio of periods in which the primary color images of blue, red, and green constituting one frame of the color image to be projected are projected is made 1:1:1.

That is, the continued time ratio b:r:g of the B-, R- and G-fields becomes 120°:120°:120° in terms of the central angles of the color wheel 24 with respect to 360° corresponding to one rotation of the color wheel 24 rotating at a constant rotational speed.

In the luminance-emphasized mode on the other side, in addition to the primary color images of blue, red, and green constituting one frame of the color image, an image of yellow is also projected. The continued time ratio of periods in which the primary color images of blue, red, green, and yellow are projected is made 1:1:1:1.

The period in which the primary color image of yellow is projected is defined as a Y-field.

That is, the continued time ratio b:r:g:y of the B-, R-, G- and Y-fields becomes 90°:90°:90°:90° in terms of the central angles of the color wheel 24 with respect to 360° corresponding to one rotation of the color wheel 24 rotating at a constant rotational speed.

All the operation control concomitant with the switching of the color mode is executed by a projection light processing section 31 under the centralized control of a CPU 32.

Figure 4B:
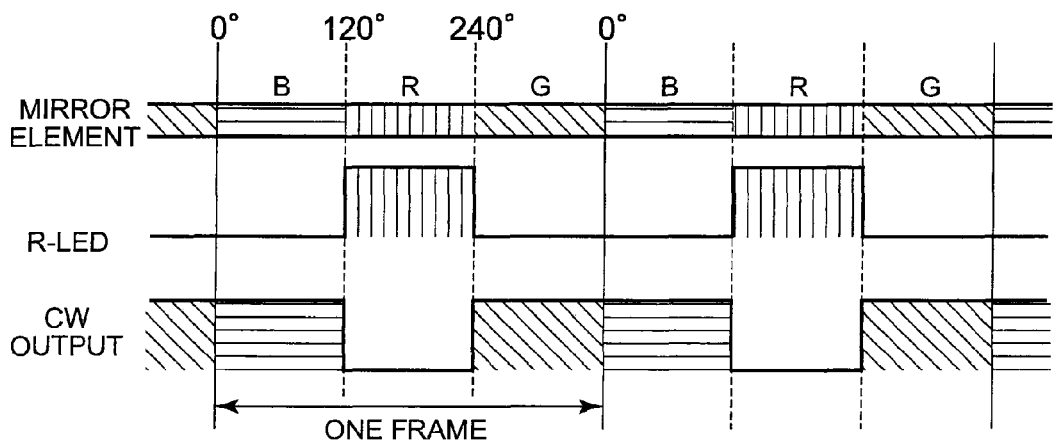

FIG. 4B shows the relationship among the color of the light figure formed at the micromirror element 16 at the normal mode time, emission timing of the LED 21, emission timing of each of the semiconductor lasers 20A, 20B, 20C, and output of the color wheel 24.

At this normal mode time, at the beginning of one frame, in the period of the B-field corresponding to 120° in terms of the central angle of the color wheel 24, blue light is emitted by the oscillation of the semiconductor lasers 20A, 20B, 20C as shown by the CW output of FIG. 4B. Further, the blue light transmitted through the blue light transmission diffusion plate 24B of the color wheel 24, and diffused is applied to the micromirror element 16.

At this time, an image corresponding to the blue light is displayed by the micromirror element 16, whereby a blue light figure is formed by the reflected light thereof, and is projected onto an external projection object through the projector lens unit 19. During this period, the LED 21 is kept in the off-state.

Thereafter, the on-state of the LED 21 is started in synchronization with a temporary stop of the oscillation of the semiconductor lasers 20A, 20B, 20C. After that, in the period of the R-field corresponding to 120° in terms of the central angle of the color wheel 24, red light is emitted by the on-state of the LED 21, and is applied to the micromirror element 16 as shown by R-LED of FIG. 4B.

At this time, an image corresponding to the red light is displayed by the micromirror element 16, whereby a red light figure is formed by the reflected light thereof, and is projected onto the external projection object through the projector lens unit 19.

During this period, the oscillation of the semiconductor lasers 20A, 20B, 20C is temporarily stopped. Accordingly, even when the blue light transmission diffusion plate 24B or green fluorescent reflection plate 24G of the color wheel 24 exists at the position on the optical axis, the oscillation of the semiconductor lasers 20A, 20B, 20C is temporarily stopped, and hence neither blue light nor green light is generated as the light-source light.

Thereafter, in synchronization with turning-off of the LED 21, the oscillation at the semiconductor laser 20A, 20B, 20C is resumed. After that, in a period of the G-field corresponding to 120° in terms of the central angle of the color wheel 24, green reflected light excited at the green fluorescent reflection plate 24G of the color wheel 24 is applied to the micromirror element 16 as the light-source light.

At this time, an image corresponding to the green light is displayed by the micromirror element 16, whereby a green light figure is formed by the reflected light thereof, and is projected onto the external projection object through the projector lens unit 19.

Furthermore, the color wheel 24 rotates to terminate the G-field and one-frame periods.

Thereafter, when the blue light transmission diffusion plate 24B is positioned again on the optical axis from the semiconductor lasers 20A, 20B, 20C in place of the green fluorescent reflection plate 24G, the B-field period of the next frame is started.

As described above, the oscillation-timing and turning-on-timing of each of the semiconductor lasers 20A, 20B, 20C, and LED 21 are controlled in synchronization with the rotation of the color wheel 24 on which the blue light transmission diffusion plate 24B and green fluorescent reflection plate 24G are formed. As a result of this, the green and blue light resulting from the oscillation of the semiconductor lasers 20A, 20B, 20C, and red light resulting from the on-state of the LED 21 are cyclically generated by time division, and are applied to the micromirror element 16.

Next, an operation at the luminance-emphasized mode time will be described below.

Figure 4C:
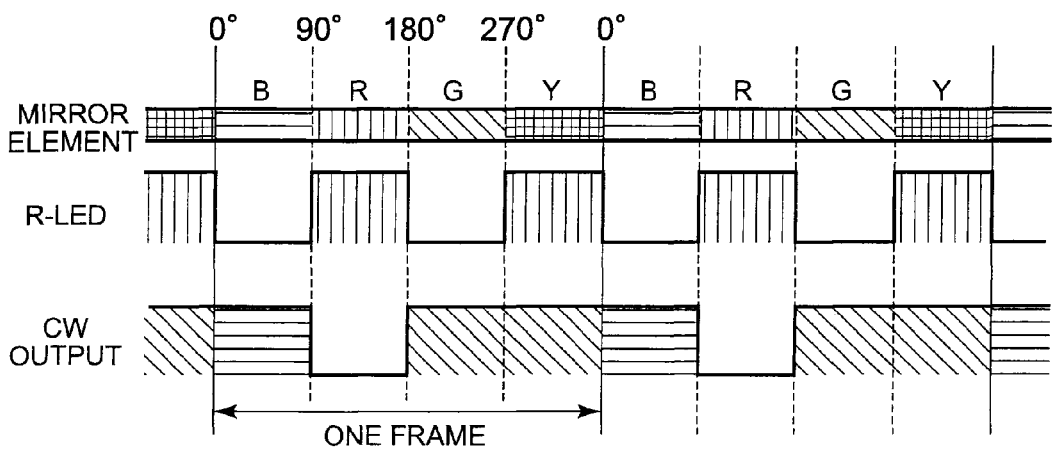
Figure 5A:
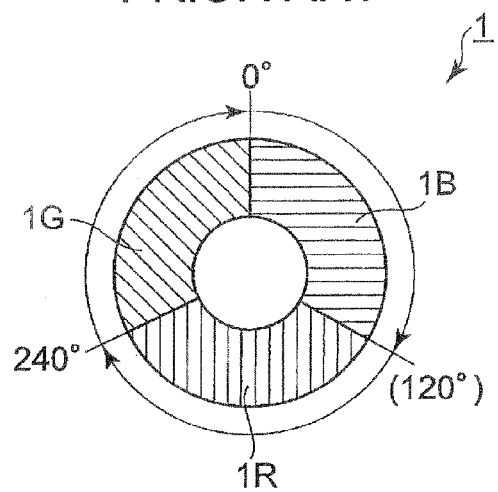
FIGS. 5A and 5B are views respectively showing the configuration of a color wheel used in a general projector apparatus of the DLP (registered trademark) system, and relationship between the configuration and the color of outgoing light based on the color wheel.
Figure 5B:
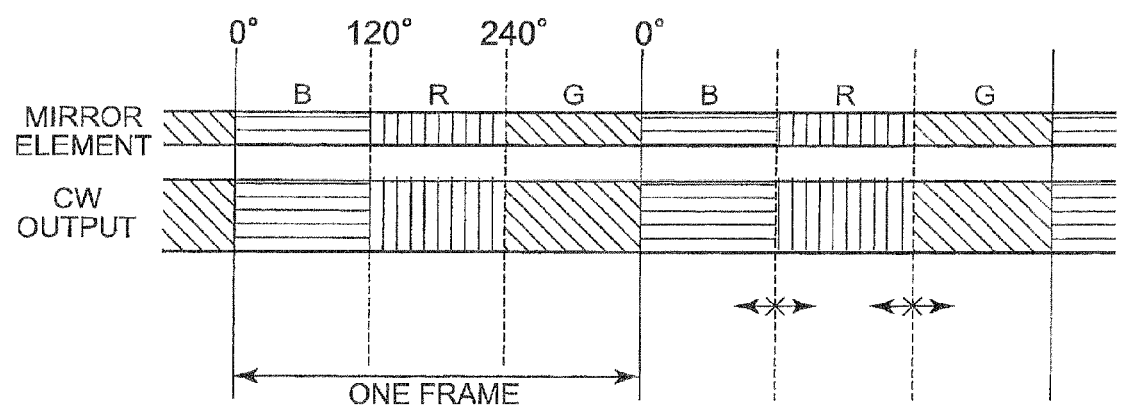

FIG. 4C shows the relationship among the color of the light figure formed at the micromirror element 16 at the luminance-emphasized mode time, emission timing of the LED 21, emission timing of each of the semiconductor lasers 20A, 20B, 20C, and output of the color wheel 24.

At this luminance-emphasized mode time, at the beginning of one frame, in the period of the B-field corresponding to 90° in terms of the central angle of the color wheel 24, blue light is emitted by the oscillation of the semiconductor lasers 20A, 20B, 20C as shown by the CW output of FIG. 4C. Further, the blue light transmitted through the blue light transmission diffusion plate 24B of the color wheel 24, and diffused is applied to the micromirror element 16.

At this time, an image corresponding to the blue light is displayed by the micromirror element 16, whereby a blue light figure is formed by the reflected light thereof, and is projected onto an external projection object through the projector lens unit 19. During this period, the LED 21 is kept in the off-state.

Thereafter, the on-state of the LED 21 is started in synchronization with a temporary stop of the oscillation of the semiconductor lasers 20A, 20B, 20C. After that, in the period of the R-field corresponding 90° in terms of the central angle of the color wheel 24, red light is emitted by the on-state of the LED 21, and is applied to the micromirror element 16 as shown by R-LED of FIG. 4C.

At this time, an image corresponding to the red light is displayed by the micromirror element 16, whereby a red light figure is formed by the reflected light thereof, and is projected onto the external projection object through the projector lens unit 19.

During this period, the oscillation of the semiconductor lasers 20A, 20B, 20C is temporarily stopped. Accordingly, even when the blue light transmission diffusion plate 24B or green fluorescent reflection plate 24G of the color wheel 24 exists at the position on the optical axis, the oscillation of the semiconductor lasers 20A, 20B, 20C is temporarily stopped, and hence neither blue light nor green light is generated as the light-source light.

Thereafter, in synchronization with turning-off of the LED 21, the oscillation at the semiconductor laser 20A, 20B, 20C is resumed. After that, in a period of the G-field corresponding to 90° in terms of the central angle of the color wheel 24, green reflected light excited at the green fluorescent reflection plate 24G of the color wheel 24 is applied to the micromirror element 16 as the light-source light.

At this time, an image corresponding to the green light is displayed by the micromirror element 16, whereby a green light figure is formed by the reflected light thereof, and is projected onto the external projection object through the projector lens unit 19.

Furthermore, the color wheel 24 rotates to terminate the G-field. Thereafter, the on-state of the LED 21 is further started without subsequently stopping the oscillation of the semiconductor lasers 20A, 20B, 20C. After that, in the Y-field period corresponding to 90° in terms of the central angle of the color wheel 24, red light is emitted by the on-state of the LED 21 as shown by R-LED of FIG. 4C.

Accordingly, yellow light resulting from the color mixture of the red light based on the on-state of the LED 21, and green light based on the reflection at the green fluorescent reflection plate 24G is applied to the micromirror element 16.

At this time, an image corresponding to the yellow color is displayed by the micromirror element 16, whereby a yellow light figure is formed by the reflected light thereof, and is projected onto the external projection object through the projector lens unit 19.

Furthermore, the color wheel 24 rotates to terminate the Y-field and one-frame periods. Thereafter, when the blue light transmission diffusion plate 24B is positioned again on the optical axis from the semiconductor lasers 20A, 20B, 20C in place of the green fluorescent reflection plate 24G, the B-field period of the next frame is started.

As described above, the oscillation-timing and turning-on-timing of each of the semiconductor lasers 20A, 20B, 20C, and LED 21 are controlled in synchronization with the rotation of the color wheel 24 on which the blue light transmission diffusion plate 24B and green fluorescent reflection plate 24G are formed. As a result of this, the green and blue light resulting from the oscillation of the semiconductor lasers 20A, 20B, 20C, red light resulting from the on-state of the LED 21, and yellow light resulting from the color mixture are cyclically generated by time division, and are applied to the micromirror element 16.

Furthermore, the R-field resulting from the on-state of the LED 21 is arranged in synchronization with the timing of the border between the blue light transmission diffusion plate 24B, and green fluorescent reflection plate 24G each constituting the color wheel 24, and the emission timing of each of the semiconductor lasers 20A, 20B, 20C, and LED 21 is controlled as shown at the normal mode time, and luminance-emphasized mode time described above, whereby it is made possible to adjust the time length of each of the B-, R-, G- and Y-fields provided as the need arises all of which are in the one frame period.

As a result of this, in this operation example too, it becomes possible to respond to desired color environment such as color balance, brightness of the projection image, or the like, as needed.

Particularly, in the luminance-emphasized mode shown in another operation example described above, the projection time of the yellow image based on the yellow color closer to the luminance component owing to the color mixture of the green and red light than the other primary color components each of which singly uses each light source is newly provided, and hence it is possible to significantly improve the luminance of the overall image, and project a bright image.

It should be noted that although not shown in the above operation example, a period may be provided in which red light based on the LED 21 is emitted simultaneously with the timing at which the blue light transmission diffusion plate 24B of the color wheel 24 is present on the light path from the semiconductor lasers 20A, 20B, 20C, magenta light is generated by the color mixture, and a corresponding light figure is formed.

Further, when attention is paid to the turning-on period of the LED 21 shown by R-LED of FIG. 4C, the on-state and off-state of the LED 21 are provided in two cycles for the two fields including the R- and Y-fields in each of which the on-state of the LED 21 is required in one frame.

By increasing the drive frequency of the LED 21, and shortening the continuous on-time as described above, it is possible to maintain emission drive at stable and high luminance while taking the characteristics of the LED 21 that the emission luminance is lowered by the thermal resistance due to continuous drive into consideration.

It should be noted that the above embodiment has been described on the assumption that while the blue laser light is oscillated by the semiconductor lasers 20A, 20B, 20C, and the blue and green light are generated by the color wheel, the red light is emitted from the LED 21. However, the present invention is not limited to this and, for example, the LED 21 may be changed to a semiconductor laser configured to oscillate red laser light. In this case, it becomes necessary to provide a diffusion plate configured to diffuse red laser light to generate red light at a position on the optical axis of the semiconductor laser configured to oscillate the red laser light.

That is, when the luminance balance of primary color light which can be emitted by using one light source is not suitable for practical use, the present invention can be applied to a light source section in which a plurality of types of light sources are used to compensate the above drawback by using another light source, and a projection apparatus using such a light source section.

Further, in the above embodiment, the case where the present invention is applied to a data projector apparatus of the DLP (registered trademark) system has been described. However, the present invention can also be applied to a liquid crystal projector or the like configured to form a light figure by using a transmission type monochrome liquid crystal panel in the same manner.

Furthermore, the present invention is not limited to the embodiment described above, and can be variously modified in the implementation stage within the scope not deviating from the gist of the invention. Further, the functions carried out in the above-mentioned embodiment may be appropriately combined with each other to the utmost extent to be implemented. Various stages are included in the above-mentioned embodiment, and by appropriately combining a plurality of disclosed constituent elements with each other, various inventions can be extracted. For example, even when some constituent elements are deleted from all the constituent elements shown in the embodiment, if an advantage can be obtained, the configuration from which the constituent elements are deleted can be extracted as an invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light source device comprising:
   a first light source configured to emit light in a first wavelength band;
   a light-source light generation section configured to generate light-source light of each of a plurality of colors by time division by using light-emission of the first light source;
   a second light source configured to generate light-source light of a second wavelength band different from the first wavelength band; and
   a light source control section configured to cause each of the light-source light generation section and the second light source to generate light-source light in one period, and to control a drive timing of each of the first and second light sources to adjust a light-emission timing of light-source light generated by each of the light-source light generation section and the second light source;
   wherein the light-source light generation section comprises a color wheel configured to generate light-source light of a third wavelength band different from the first and second wavelength bands by using light-emission of the first light source; and
   wherein the light source control section is configured to control at least one light-emission period of the second light source to be a period that includes a phase corresponding to a timing of a border of a region of the color wheel for generation of the light-source light of the first wavelength band and a region of the color wheel for generation of the light-source light of the third wavelength band, while switching colors by time division in one period by the color wheel, and to control light-emission of the first light source to be stopped in the light-emission period of the second light source.

2. The light source device according to claim 1, wherein the color wheel is formed by providing at least a fluorescent substance layer for generating light of a green wavelength band by using light of the first light source as excitation light, and a diffusion layer for diffusing/transmitting the light of the first light source, in a juxtaposing manner in a circumferential direction of the color wheel.

3. The light source device according to claim 1, wherein at least two color modes different from each other in control condition for the light source control section are provided, and the color modes are switched between each other.

4. The light source device according to claim 3, wherein the color modes include two color modes different from each other in a ratio of emission periods in the one period of the light-source light generated by the light-source light generation section and the second light source.

5. The light source device according to claim 1, wherein the light source control section is configured to generate color-mixed light-source light produced by causing a light emission period of light-source light of at least one of a plurality of colors generated by the light-source light generation section and a light emission period of light-source light of the second light source to partially overlap each other.

6. The light source device according to claim 5, wherein the light source control section is configured to control a drive timing of each of the first and second light sources such that a period in which the second light source singly emits light, and a period in which both the first light source and the second light source emit light to generate color-mixed light-source light are separate from each other in terms of time.

7. The light source device according to claim 1, wherein the first light source comprises a laser light source configured to emit laser light of a blue wavelength band.

8. The light source device according to claim 1, wherein the second light source comprises a light-emitting diode or a laser light source for emitting red wavelength band light.

9. A projection apparatus comprising:
   a light source device comprising:
      a first light source configured to emit light in a first wavelength band;
      a light-source light generation section configured to generate light-source light of each of a plurality of colors by time division by using light-emission of the first light source;
      a second light source configured to generate light-source light of a second wavelength band different from the first wavelength band; and
      a light source control section configured to cause each of the light-source light generation section and the second light source to generate light-source light in one period, and to control a drive timing of each of the first and second light sources to adjust a light-emission timing of light-source light generated by each of the light-source light generation section and the second light source;
      wherein the light-source light generation section comprises a color wheel configured to generate light-source light of a third wavelength band different from the first and second wavelength bands by using light-emission of the first light source; and
      wherein the light source control section is configured to control at least one light-emission period of the second light source to be a period that includes a phase corresponding to a timing of a border of a region of the color wheel for generation of the light-source light of the first wavelength band and a region of the color wheel for generation of the light-source light of the third wavelength band, while switching colors by time division in one period by the color wheel, and to control light-emission of the first light source to be stopped in the light-emission period of the second light source;
   an input section configured to input an image signal; and
   a projection section configured to form and project a light figure of each color corresponding to the image signal input by the input section by using light-source light generated from each of the light-source light generation section and the second light source under control carried out by the light source control section.

10. A projection method applied to a projection apparatus including a first light source configured to emit light in a first wavelength band, a light-source light generation section configured to generate light-source light of each of a plurality of colors by time division by using light-emission of the first light source, a second light source configured to generate light-source light of a second wavelength band different from the first wavelength band, an input section configured to input an image signal, and a projection section configured to form and project a light figure of each color corresponding to the image signal input by the input section by using light-source light generated from each of the light-source light generation section and the second light source, the method comprising:

causing each of the light-source light generation section and the second light source to generate light-source light in one period, and controlling a drive timing of each of the first and second light sources to adjust a light-emission timing of the light-source light generated by each of the light-source light generation section and the second light source;

wherein the light-source light generation section comprises a color wheel configured to generate light-source light of a third wavelength band different from the first and second wavelength bands by using light-emission of the first light source; and wherein controlling the drive timing of each of the first and second light sources comprises controlling at least one light-emission period of the second light source to be a period that includes a phase corresponding to a timing of a border of a region of the color wheel for generation of the light-source light of the first wavelength band and a region of the color wheel for generation of the light-source light of the third wavelength band, while switching colors by time division in one period by the color wheel, and controlling light-emission of the first light source to be stopped in the light-emission period of the second light source.

* * * * *